(12) United States Patent
Kubo et al.

(10) Patent No.: US 7,375,482 B2
(45) Date of Patent: May 20, 2008

(54) DRIVING DEVICE OF MOTOR

(75) Inventors: Mamoru Kubo, Isesaki (JP); Kenji Nojima, Ota (JP); Kazuhisa Otagaki, Gunma (JP); Yoshio Tomigashi, Hirakata (JP); Keiji Kishimoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/523,002

(22) Filed: Sep. 19, 2006

(65) Prior Publication Data
US 2007/0063666 A1    Mar. 22, 2007

(30) Foreign Application Priority Data
Sep. 20, 2005   (JP) .............................. 2005-271765

(51) Int. Cl.
H02P 21/00    (2006.01)
H02P 6/20     (2006.01)

(52) U.S. Cl. ..................... 318/254; 318/430; 318/720

(58) Field of Classification Search ................ 318/138, 318/254, 430–434, 439, 720–724
See application file for complete search history.

(56) References Cited

U.S. PATENT DOCUMENTS

| | | | | |
|---|---|---|---|---|
| 4,641,066 A | * | 2/1987 | Nagata et al. ............... | 318/254 |
| 4,712,050 A | * | 12/1987 | Nagasawa et al. ........... | 318/254 |
| 5,177,416 A | * | 1/1993 | Inaji et al. .................... | 318/254 |
| 5,223,772 A | * | 6/1993 | Carobolante ................. | 318/254 |
| 5,254,914 A | * | 10/1993 | Dunfield et al. ............. | 318/254 |
| 5,640,073 A | * | 6/1997 | Ikeda et al. .................. | 318/439 |
| 7,071,640 B2 | * | 7/2006 | Kurosawa et al. ........... | 318/254 |

FOREIGN PATENT DOCUMENTS

| | | |
|---|---|---|
| JP | 2004-48886 A | 2/2004 |
| JP | 3612636 | 11/2004 |

* cited by examiner

Primary Examiner—Bentsu Ro
(74) Attorney, Agent, or Firm—McDermott Will & Emery LLP

(57) ABSTRACT

An object is to provide a driving device capable of smoothly shifting from a starting state to a sensor-less vector control, in a case where the device drives a motor by the sensor-less vector control, and the device includes a voltage detecting circuit which detects an induced electromotive voltage of the motor. A control circuit starts the motor by rectangular wave control. A magnetic pole position of a rotor is detected based on an induced electromotive voltage of one remaining phase of the motor detected by the voltage detecting circuit. The control circuit controls a main inverter circuit based on the detected magnetic pole position, and accelerates the motor by the rectangular wave control. In a case where a predetermined shift revolution speed is reached, the control circuit shifts to vector control by the sensor-less in which the magnetic pole position detected during the rectangular wave control is used as an initial value.

4 Claims, 4 Drawing Sheets

DRIVING DEVICE OF MOTOR

BACKGROUND OF THE INVENTION

The present invention relates to a driving device which controls a motor by a sensor-less vector control system without using any magnetic pole positional sensor.

Heretofore, in a case where a permanent magnet synchronous motor is operated by a sensor-less vector control, it is necessary to estimate a magnetic pole position of a rotor without using any sensor. As an estimating method, there are a method based on a fundamental wave of an induced electromotive voltage and a method based on a high harmonic wave, but the method based on the fundamental wave can only be applied to a medium to high speed region. That is, the induced electromotive voltage is small in a stop position and a low-speed region, it is difficult to detect the voltage, and a high-frequency voltage or current is injected to generate the high harmonic wave of the induced electromotive voltage and estimate the magnetic pole position. Therefore, in a sensor-less system for a high speed, the fundamental wave of the induced electromotive voltage is utilized. In a sensor-less system for a low speed, there is utilized a method of injecting the harmonic.

In an actual vector control, with respect to a d-q axis which the magnetic pole position of the rotor of the synchronous motor is a rotary position at a real angle $\theta d$, a dc-qc axis is supposed in which an estimated angle $\theta dc$ is obtained in the control system. An axial error $\Delta\theta$ between the axis is estimated and calculated. So as to set this axial error $\Delta\theta$ to zero, the estimated magnetic pole position is feed back and corrected, and this allows an actual magnetic pole position to meet a controlled magnetic pole position.

According to such a vector control, it is possible to ideally control a torque generated in the motor by an inverter in accordance with load conditions, and it is possible to realize a control of the revolution speed of motor with high efficiency and precision. Since there is not any sensor-less vector control system that is usable at low to high speeds, however, there is proposed a method and the like in which, for example, after the motor is started under a constant V/F control without the necessity of detecting the magnetic pole position, the control is shifted to the vector control using a preset initial magnetic pole position at a predetermined revolution speed (see, e.g., Japanese Patent Application Laid-Open No. 2004-48886).

Moreover, there is also a system in which after starting the motor, the sensor-less vector control for the low speed is executed, and the control is shifted to the sensor-less vector control for the high speed. In this case, there is proposed the use of the magnetic pole position obtained by weighted-averaging the positions detected for the low and high speeds in the vicinity of the switching between the low speed and the high speed (see, e.g., Japanese Patent No. 3612636).

Thus, there are proposed various control systems after the motor starts until the motor reaches the predetermined revolution speed at which the detection of the magnetic pole position (estimation of the magnetic pole position using the induced electromotive voltage in the sensor-less vector control for the high speed) is possible in a case where the sensor-less vector control for the high speed is performed. However, if an axial error is large between the actual magnetic pole position immediately after the control has shifted to the sensor-less vector control and the initially set magnetic pole position, there rises a danger that the motor runs out of step and fails in starting in the feedback control.

Moreover, even in the system in which the sensor-less vector control for the low speed shifts to the sensor-less vector control for the high speed as described above, the motor easily runs out of step immediately after the shifting. Furthermore, in a case where a load torque is larger or, for example, a case where a difference between a high pressure and a low pressure of a refrigerant circuit becomes large in the motor for a compressor to thereby increase fluctuations of the load torque, the motor easily runs out of step especially during the shift to the sensor-less vector control described above.

SUMMARY OF THE INVENTION

The present invention has been developed in order to solve the above-described conventional technical problem, and an object thereof is to provide a driving device which can smoothly shift from a starting state to a sensor-less vector control in a case where a motor is driven by the sensor-less vector control.

The present invention is characterized by a driving device of a motor comprising a main inverter circuit which applies a pseudo three-phase alternating voltage to a motor to drive the motor; current detecting means for detecting a current which flows through the motor; and control means for executing a sensor-less vector control based on an output of this current detecting means, the driving device further comprising voltage detecting means for detecting an induced electromotive voltage of the motor, wherein the control means starts the motor by rectangular wave control, detects a magnetic pole position of a rotor based on the induced electromotive voltage of one remaining phase of the motor detected by the voltage detecting means, controls the main inverter circuit based on the detected magnetic pole position, and accelerates the motor by the rectangular wave control, and in a case where a predetermined shift revolution speed is reached, the control means shifts to vector control by the sensor-less in which the magnetic pole position detected during the rectangular wave control is used as an initial value.

Moreover, a second invention is characterized by a driving device of a motor comprising a main inverter circuit which applies a pseudo alternating voltage to a motor to drive the motor; current detecting means for detecting a current which flows through the motor; and control means for executing a sensor-less vector control based on an output of this current detecting means, wherein the control means starts and accelerates the motor by a constant V/F control, and detects a magnetic pole position of a rotor based on an output of the current detecting means during the constant V/F control, and in a case where a predetermined shift revolution speed is reached, the control means shifts to the sensor-less vector control in which the magnetic pole position detected just before is used as an initial value.

Furthermore, a driving device of a motor according to a third invention is characterized in that, when the control means drives the motor at a revolution speed lower than the shift revolution speed after started, the control means once accelerates the motor up to the shift revolution speed, shifts to the sensor-less vector control, and thereafter lowers the revolution speed.

In addition, a driving device of a motor according to a fourth invention is characterized in that the control means changes the shift revolution speed in accordance with a load situation of the motor.

According to the present invention, the control means starts the motor by the rectangular wave control, and utilizes the induced electromotive voltage of one remaining phase to detect the magnetic pole position of the rotor. Moreover, the control means accelerates the motor by the rectangular wave control based on this detected magnetic pole position, and shifts to the vector control by the sensor-less, when the predetermined shift revolution speed is reached. In this case, however, as the initial value of the magnetic pole position during the sensor-less vector control, the magnetic pole position just detected during the rectangular wave control is used. Therefore, an axial error between an actual rotor magnetic pole position and an estimated magnetic pole position can be minimized, step-out is avoided during the shift to the vector control by the sensor-less, and a stable control of the driving of the motor can be realized from the starting till the sensor-less vector control.

Furthermore, according to the second invention, the control means starts the motor by the constant V/F control, accelerates the motor, and shifts to the vector control by the sensor-less, when the predetermined shift revolution speed is reached. In this case, however, a rotor magnetic pole position which is not originally required is detected beforehand during the constant V/F control, and as the initial value of the magnetic pole position during the sensor-less vector control, the magnetic pole position just detected during the constant V/F control is used. Therefore, the axial error between the actual rotor magnetic pole position and the estimated magnetic pole position can similarly be minimized, the step-out is avoided during the shift to the vector control by the sensor-less, and the stable control of the driving of the motor can be realized from the starting till the sensor-less vector control.

In addition, according to the third invention, in addition to the above inventions, when the control means drives the motor at the revolution speed lower than the shift revolution speed after started, the control means once accelerates the motor up to the shift revolution speed, shifts to the sensor-less vector control, and thereafter lowers the revolution speed. Therefore, even when the motor needs to be driven at the low revolution speed from the beginning of the starting, the sensor-less vector control can be executed without any trouble.

Moreover, according to the fourth invention, in addition to the above inventions, since the control means changes the shift revolution speed in accordance with the load situation of the motor. Therefore, for example, in a case where a load torque of the motor, a degree of fluctuation of the load torque or the like is large, after the control means accelerates the motor up to a higher revolution speed, the means shifts to the sensor-less vector control. Accordingly, a danger of step-out can further securely be avoided. In a case where the load torque is small, when the means shifts to the sensor-less vector control at a lower revolution speed, the means can promptly shift to the driving by the sensor-less vector control with high precision and performance.

DETAILED DESCRIPTION OF THE PREFERRED EMBODIMENT

Next, embodiments of the present invention will be described in detail with reference to the drawings. In the following embodiments, a motor M is an incorporated permanent magnet type synchronous motor to drive a motor compressor (not shown) which is to be mounted on, for example, a automobile air conditioner and in which carbon dioxide is used as a refrigerant. The motor M is stored together with, for example, a rotary compression element in a shell of such a compressor, and is used to rotate and drive the compression element.

Embodiment 1

Figure 1:
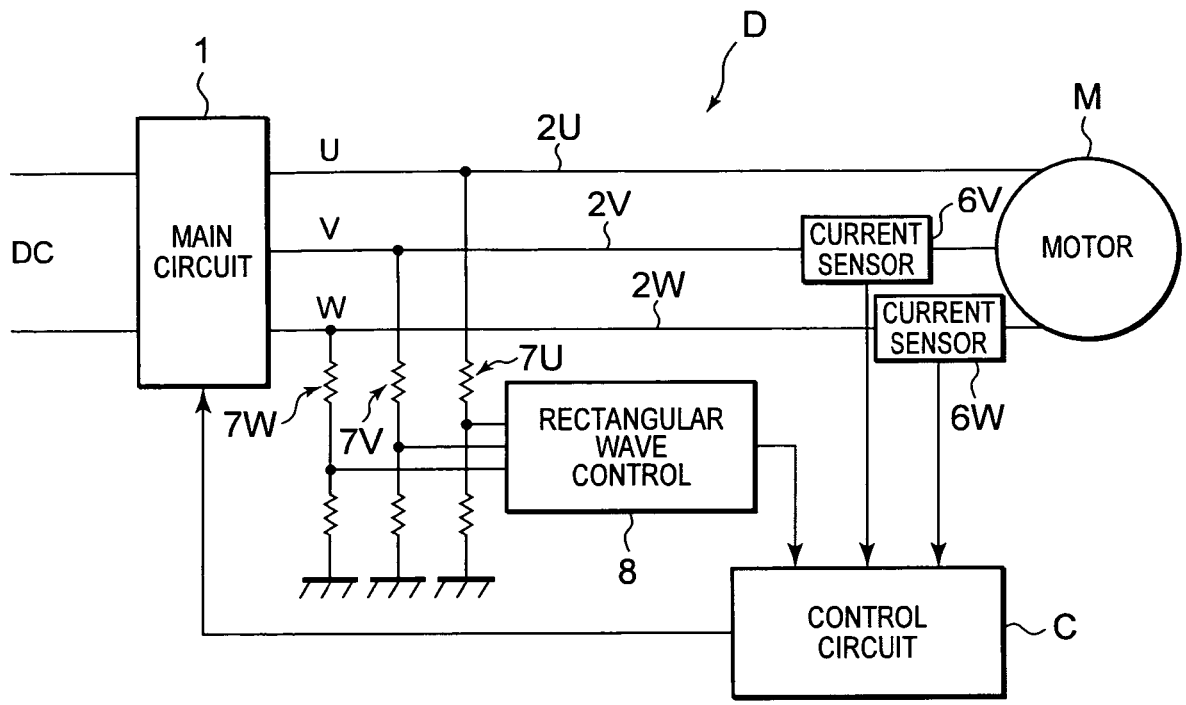
FIG. 1 is an electric circuit diagram of a driving device of a motor in one embodiment of the present invention.
Figure 2:
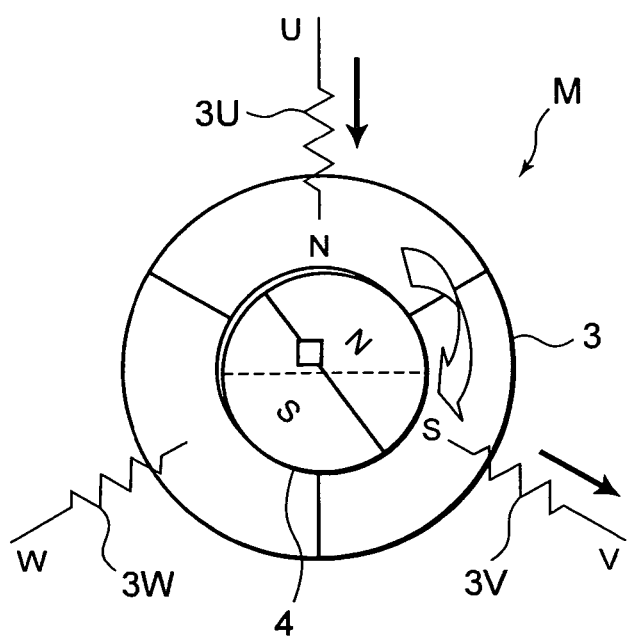
FIG. 2 is a constitution diagram of the motor of FIG. 1.
Figure 3:
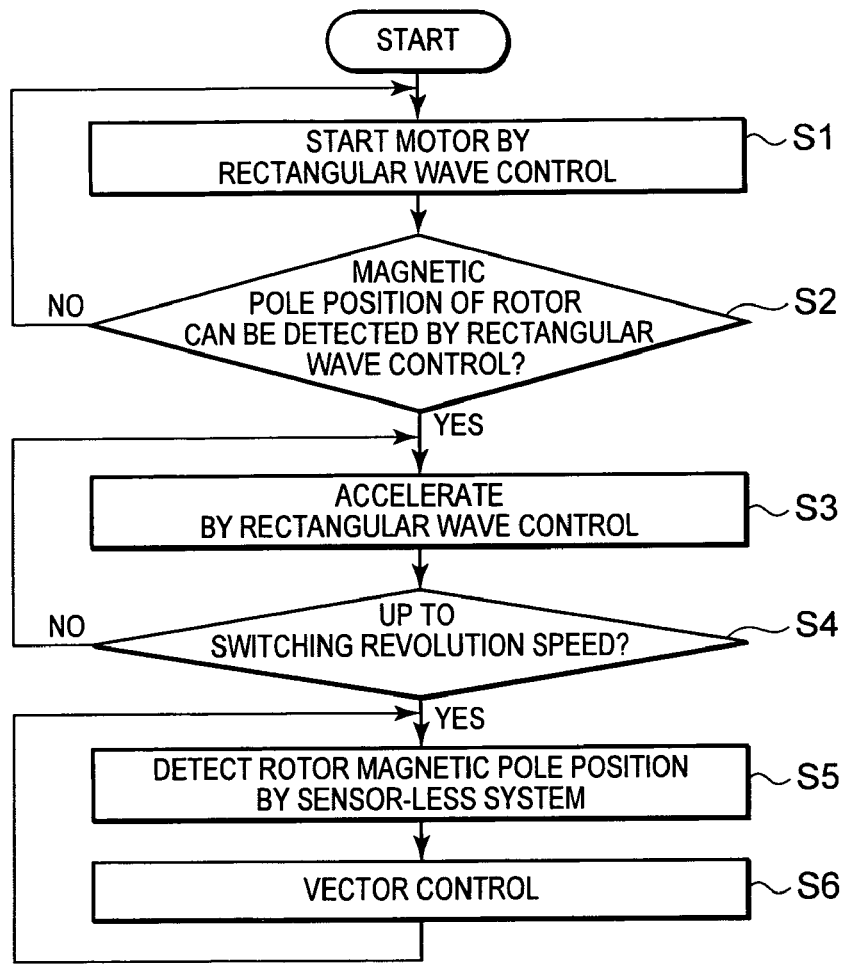
FIG. 3 is a flow chart showing a control program of a control circuit constituting the driving device of FIG. 1.

First, FIG. 1 is an electric circuit diagram of a driving device D of a motor M in one embodiment (Embodiment 1) of the present invention, FIG. 2 is a constitution diagram of the motor M, and FIG. 3 is a flow chart showing a control program of a control circuit C as control means constituting the driving device D. The driving device D of the present embodiment is constituted of: a main inverter circuit 1 (vector control inverter) including six switching elements connected to a direct-current power source DC as a battery of an automobile; the control circuit (control means) C which controls commutations of the switching elements of this main inverter circuit 1 to apply a pseudo three-phase alternating voltage to the motor M.

Moreover, the motor M is a synchronous motor (FIG. 2) constituted of: a stator 3 around which three-phase coils 3U, 3V and 3W are wound by, for example, a concentrated widing; and an incorporated permanent magnet type rotor 4 which rotates in this stator 3. The three-phase coils 3U, 3V and 3W of U, V and W-phases of the stator 3 are connected to secondary lines 2U, 2V and 2W of phases of the main inverter circuit 1, respectively.

Furthermore, the secondary lines 2V and 2W of the V and W-phases are provided with current sensors (current detecting means) 6V, 6W including current transformers for detecting currents which flow through the V and W-phases of the motor M, respectively, and outputs (detected current values) of the current sensors 6V, 6W are input into the control circuit C. Furthermore, the secondary lines 2U, 2V and 2W of the phases are connected to voltage detecting circuits (voltage detecting means) 7U, 7V and 7W including voltage divider resistances for detecting voltages induced in the lines, respectively. Terminal voltages (divided detected voltage values) of the voltage detecting circuits 7U, 7V and 7W are input into a rectangular wave control position detecting circuit (constituting the control means) 8. An output of this rectangular wave control position detecting circuit 8 is also input into the control circuit C. This rectangular wave control position detecting circuit 8 or the control circuit C is constituted of a general-purpose microcomputer. It is to be noted that in the present embodiment, the rectangular wave control position detecting circuit 8 is shown separately from the control circuit C, but needless to say, a function of the detecting circuit may impart to the control circuit C.

In this case, the rectangular wave control position detecting circuit 8 is a circuit for detecting a magnetic pole position of the rotor 4 in a case where the motor M is rectangular wave control.

(Concerning Rectangular Wave Control)

Figure 4:
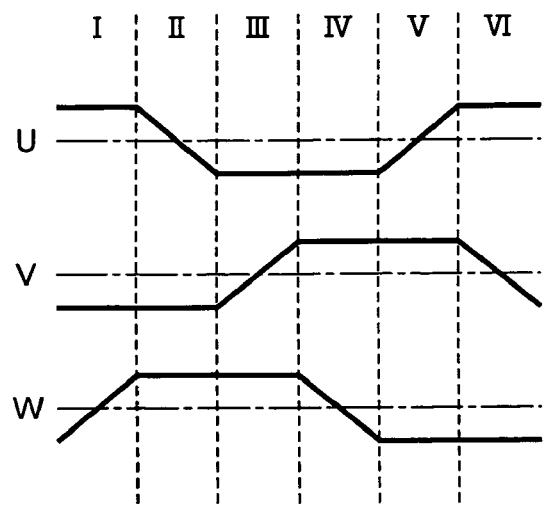
FIG. 4 is a diagram showing a voltage of each phase of the motor during rectangular wave control.

The rectangular wave control is a so-called 120° energization system. Only two of the coils 3U, 3V and 3W of the phases of the stator 3 are energized, and any current is not passed through one remaining phase. FIG. 4 shows voltages of the phases of the motor M during the rectangular wave control. In FIG. 4: in a mode I, a current is passed from the U-phase to the V-phase (any current is not passed through the W-phase); in a mode II, the current is passed from the W-phase to the V-phase (any current is not passed through the U-phase); in a mode III, the current is passed from the W-phase to the U-phase (any current is not passed through the V-phase); in a mode IV, the current is passed from the V-phase to the U-phase (any current is not passed through the W-phase); in a mode V, the current is passed from the V-phase to the W-phase (any current is not passed through the U-phase); and in a mode VI, the current is passed from the U-phase to the W-phase (any current is not passed through the V-phase).

In one remaining phase through which any current is not passed, as shown in FIG. 4, an induced electromotive voltage appears (tilted line in FIG. 4). Into the rectangular wave control position detecting circuit 8, the induced electromotive voltages of the phases (through which any current is not passed) detected by the voltage detecting circuits 7U to 7W are input. Based on the initial values, a magnetic pole position estimating signal of the rotor 4 is obtained by a so-called analog filter system or a reference voltage comparison system without any sensor. Moreover, this estimated magnetic pole position signal during the rectangular wave control is input into the control circuit C.

During this rectangular wave control, detected positional information may be obtained every 60°, and the current does not have to be converted into a sine wave. Therefore, the voltage does not have to be controlled into a sine waveform, and there is an advantage that a control system can be simplified. However, the rectangular wave control is disadvantageous in voltage use ratio as compared with vector control. Moreover, since the control can be executed only every 60°, a control precision is lower than that of the vector control described later. There is also a disadvantage that a torque fluctuates more largely.

(Concerning Vector Control)

On the other hand, the vector control is a so-called 180° energization system. Since a sine-wave voltage is applied to the three-phase coils 3U, 3V and 3W of the stator 3 to drive the motor. Therefore, there are more advantages in respect of the voltage use ratio and the torque fluctuation as compared with the rectangular wave control. However, since a current phase is controlled to be optimum with respect to a magnetic flux of a permanent magnet of the rotating rotor 4, fine information on the magnetic pole position is required.

There will be described hereinafter a method of detecting the magnetic pole position during the vector control without any sensor. With respect to a d-q axis (d-axis is a rotor magnetic flux axis, q-axis is an induced electromotive voltage axis) in which the magnetic pole position of the rotor 4 of the motor M is a rotary position (actual magnetic pole position) at a real angle $\theta d$, there is considered a dc-qc axis which an estimated angle $\theta dc$ is obtained in the control circuit C. Here, the angle $\theta dc$ is prepared in the control circuit C. Therefore, if an axial error $\Delta\theta$ ($\Delta\theta=\theta dc-\theta d$) can be calculated, the magnetic pole position of the rotor 4 can be estimated.

In actual, in a case where a motor model formula is solved in which voltage commands vd* and vq* to be given to, for example, the main inverter circuit 1 are represented by a winding resistance r, a d-axis inductance Ld, a q-axis inductance Lq, a power generation constant kE, a d-axis current command Id*, a q-axis current command Iq*, a detected q-axis current value Iq, a speed command $\omega 1*$ and the like together with the axial error $\Delta\theta$, the magnetic pole position of the rotor 4 is estimated.

(Concerning Sensor-Less Vector Control)

The control circuit C executes the sensor-less vector control of the motor M based on the magnetic pole position of the rotor 4 detected by such estimation. In this case, the control circuit C separates the current detected by the current sensors 6V, 6W and flowing from the secondary lines 2V, 2W to the motor M into a q-axis current component Iq and a d-axis current component Id, and independently controls the q-axis current command Iq* and the d-axis current command Id*. For controlling the input speed command $\omega 1*$, the control-circuit determines magnitudes and phases of the voltage commands vd*, vq* so as to maximize the torque in a relation between a magnetic flux and a current phase, and a relation between the torque and an operation amount is set to be linear.

Moreover, the control circuit C adjusts the phase of the current flowing through the motor M by use of a detected d-axis current value Id. Moreover, the circuit gives the voltage commands vd*, vq* to the main inverter circuit 1, and controls the switching elements to thereby drive the motor M at a revolution speed which satisfies the speed command.

Next, there will be described an operation of the control circuit C in this case with reference to FIG. 3. In step S1, the control circuit C outputs the voltage command to the main inverter circuit 1, and subjects the coils 3U, 3V and 3W of the stator 3 of the motor M to the above-described rectangular wave control to generate a rotary magnetic field. The rotor 4 starts its rotation by this rotary magnetic field. Accordingly, the motor M starts. From this starting, the control circuit C gives the voltage command to the main inverter circuit 1 during a constant V/F control described later to drive the motor M at a constant revolution speed.

Next, the control circuit C judges in step S2 whether or not the magnetic pole position estimating signal has been input from the rectangular wave control position detecting circuit 8. By a magnetic pole position estimating method during the rectangular wave control described above, the rectangular wave control position detecting circuit 8 estimates the magnetic pole position of the rotor 4. In a case where a signal is input into the control circuit C (in this case, about one second, but this differs with the motor), the control circuit C advances to step S3 to fix the current phase to a predetermined value in synchronization of the estimated magnetic pole position, and raises the revolution speed of (accelerates) the motor M.

Next, the control circuit C judges in step S4 whether or not the revolution speed of the motor M has risen up to a predetermined shift revolution speed X Hz (in actual, 15 Hz to 30 Hz) sufficient for obtaining the induced electromotive voltage required for correctly estimating the magnetic pole position in executing the above-described sensor-less vector control. When the shift revolution speed X Hz is reached, the magnetic pole position input from the rectangular wave control position detecting circuit 8 just before in response to the magnetic pole position estimating signal of the rotor 4 is set as an initial value. Moreover, the control circuit shifts to the vector control of the motor M by the above-described sensor-less vector control by use of the initial value of this magnetic pole position.

In this sensor-less vector control, the control circuit C estimates the magnetic pole position of the rotor 4 during the above vector control in step S5, and executes a vector control in step S6. Thus, since the magnetic pole position just detected (estimated) during the rectangular wave control is used as the initial value of the rotor magnetic pole position during the sensor-less vector control, it is possible to minimize the axial error AO between the actual rotor magnetic pole position and the estimated magnetic pole position during the shift to the sensor-less vector control. Step-out during the shift can be avoided to realize the stable driving control of the motor M from the starting till the sensor-less vector control.

Embodiment 2

Figure 5:
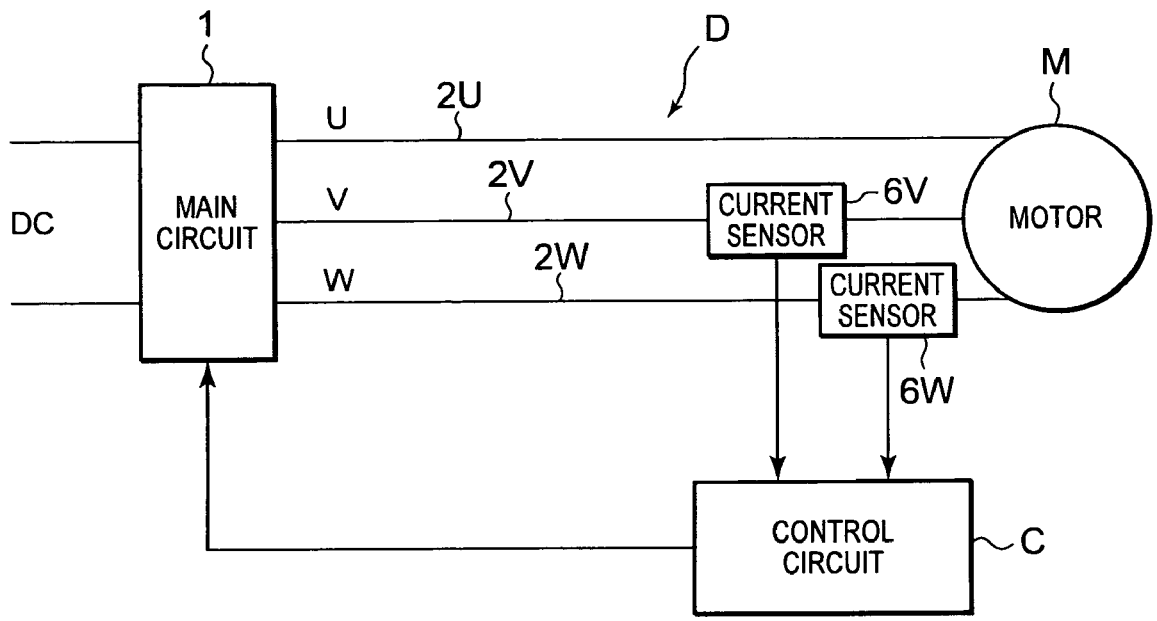
FIG. 5 is an electric circuit diagram of a driving device in another embodiment of the present invention.
Figure 6:
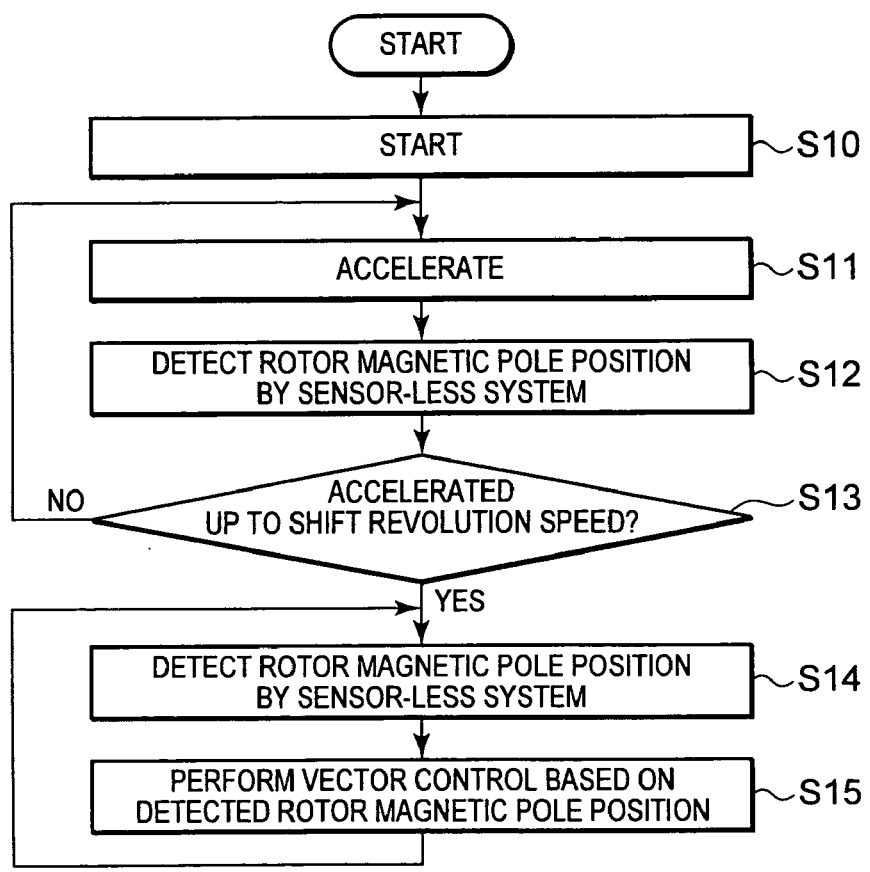
FIG. 6 is a flow chart showing a control program of a control circuit constituting the driving device of FIG. 5.

Next, a second embodiment of the present invention will be described with reference to FIGS. 5 and 6. Here, in FIG. 5, the same characters as those of FIG. 1 denote the same or similar functions. In this case, the above-described voltage detecting circuits 7U to 7W are not necessary, and the rectangular wave control position detecting circuit 8 is not used either. Needless to say, a program of a control circuit C differs.

Next, there will be described an operation of the control circuit C in this case with reference to a flow chart of FIG. 6. In step S10 of FIG. 6, the control circuit C subjects a motor M to vector control by a constant V/F control to generate a rotary magnetic field, thereby starting the motor.

(Concerning Constant V/F Control)

During this constant V/F control, the control circuit C controls a speed command ω1 and a voltage command V1 beforehand at a constant ratio. The control circuit C gives, to a main inverter circuit 1, the speed command ω1 and the voltage command V1 obtained from a preset ratio, and drives the motor M. Since this system does not require magnetic pole position information of a rotor 4, a control system is remarkably simple, but there is a disadvantage that a transient vibration is generated in response to a rapid change of a load.

After starting such a constant V/F control, the control circuit C accelerates a revolution speed of the motor M in step S11. In a case where an induced electromotive voltage required for executing a sensor-less vector control is obtained by this acceleration, in step S12, the control circuit C estimates a magnetic pole position of the rotor 4 by a magnetic pole position estimating method during vector control. Although the magnetic pole position information of the rotor 4 is not necessary during the constant V/F control as described above, the control circuit C estimates the magnetic pole position, and continues to store the position during this constant V/F control.

Next, the control circuit C judges in step S13 whether or not the revolution speed of the motor M has risen up to a predetermined shift revolution speed X Hz. When the shift revolution speed X Hz is reached, the previous magnetic pole position of the rotor 4 estimated during the constant V/F control is set as an initial value. Moreover, the control circuit shifts to a vector control of the motor M by a sensor-less vector control using this initial value of the magnetic pole position.

During this sensor-less vector control, the control circuit C estimates the magnetic pole position of the rotor 4 during the vector control in step S14, and executes the vector control in step S15. Thus, since the magnetic pole position just detected during the constant V/F control is used as the initial value of the rotor magnetic pole position during the sensor-less vector control, it is possible to minimize an axial error Δθ between an actual rotor magnetic pole position and an estimated magnetic pole position in the same manner as in Embodiment 1. Also in this case, step-out during the shift can be avoided to realize the stable driving control of the motor M from the starting till the sensor-less vector control.

Embodiment 3

Figure 7:
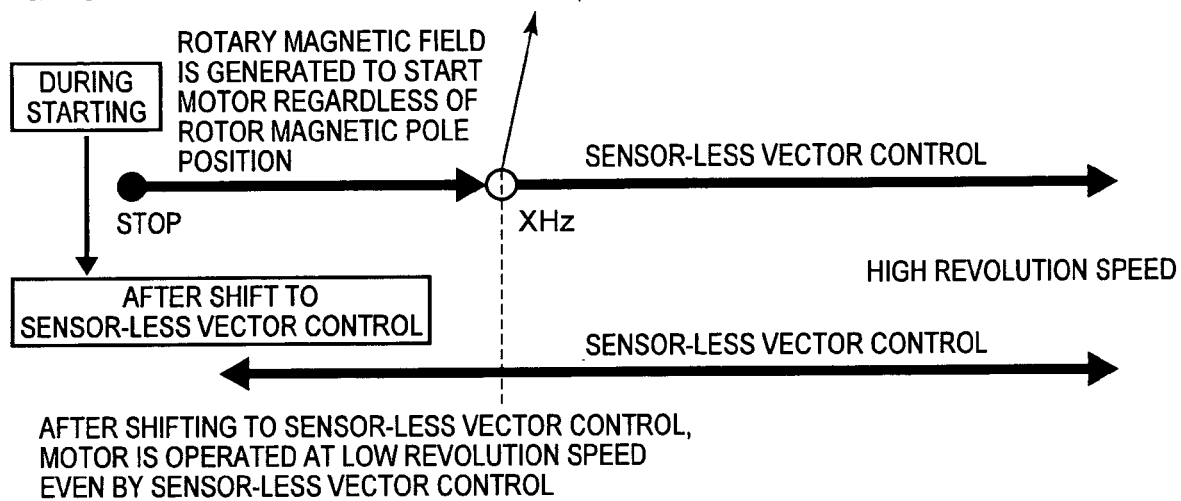
FIG. 7 is an explanatory view of a control in Embodiment 3 of the present invention.

Here, during the control of the above-described embodiments, when a control circuit C receives a speed command at a revolution speed lower than a shift revolution speed X Hz in a stopped state of a motor, the circuit once raises the speed up to the shift revolution speed X Hz, and shifts to a sensor-less vector control. Thereafter, the circuit lowers the speed down to a target revolution speed. This behavior is shown in FIG. 7.

When the control circuit C drives the motor M at the revolution speed lower than the shift revolution speed X Hz after starting the motor in this manner, the circuit once raises the speed up to the shift revolution speed X Hz, and shifts to the sensor-less vector control. Thereafter, the circuit lowers the revolution speed. In a case where this control is executed, even when it is necessary to operate the motor at the low revolution speed from the beginning of the starting, the sensor-less vector control can be executed without any trouble.

Embodiment 4

Moreover, during the control in the above-described embodiments, a control circuit C changes a shift revolution speed X Hz in accordance with a load situation of a motor M. As this load situation, there are considered a load torque, a fluctuation of the load torque during one rotation, a pressure difference of a compressor and the like. Moreover, for example, the larger the load torque of the motor M becomes, the higher the control circuit C sets the shift revolution speed X Hz. After accelerating the motor at a higher revolution speed, the control circuit shifts to a sensor-less vector control. Since step-out easily occurs with a worse load torque situation (larger load torque), it is possible to more securely avoid a danger of step-out during the shift by such a control.

Figure 8:
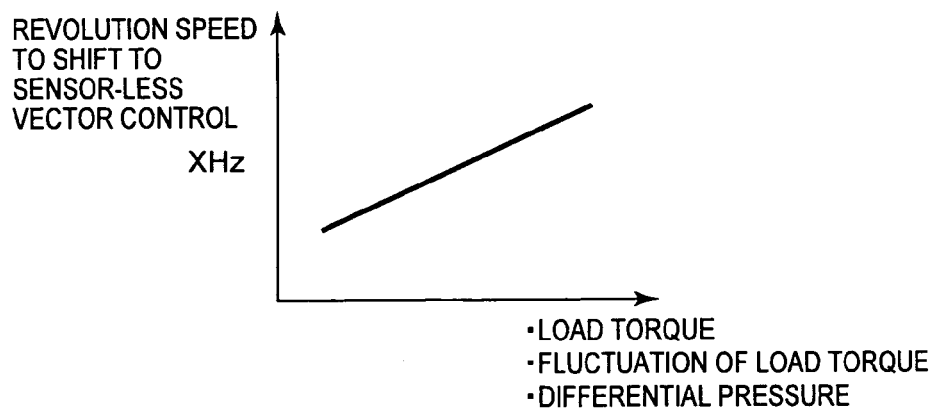
FIG. 8 is an explanatory view of a control in Embodiment 4 of the present invention.

Furthermore, the smaller the load torque is, the lower the control circuit C sets the shift revolution speed X Hz. The control circuit shifts to the control at a lower revolution speed. This behavior is shown in FIG. 8. In consequence, when the load situations are not severe, it is possible to promptly shift to driving of the motor with high precision and performance by the sensor-less vector control.

What is claimed is:
1. A driving device of a motor comprising:
  a main inverter circuit which applies a pseudo three-phase alternating voltage to a motor to drive the motor; current detecting means for detecting a current which flows through the motor; and control means for executing a sensor-less vector control based on an output of this current detecting means, the driving device further comprising voltage detecting means for detecting an induced electromotive voltage of the motor, wherein the control means starts the motor by rectangular wave control, detects a magnetic pole position of a rotor based on the induced electromotive voltage of one remaining phase of the motor detected by the voltage detecting means, controls the main inverter circuit based on the detected magnetic pole position, and accelerates the motor by the rectangular wave control, and in a case where a predetermined shift revolution speed is reached, the control means shifts to vector control by the sensor-less in which the magnetic pole position detected during the rectangular wave control is used as an initial value.

2. A driving device of a motor comprising:

a main inverter circuit which applies a pseudo alternating voltage to a motor to drive the motor;

current detecting means for detecting a current which flows through the motor; and control means for executing a sensor-less vector control based on an output of this current detecting means, wherein the control means starts and accelerates the motor by a constant V/F control, and detects a magnetic pole position of a rotor based on an output of the current detecting means during the constant V/F control, and in a case where a predetermined shift revolution speed is reached, the control means shifts to the sensor-less vector control in which the magnetic pole position detected just before is used as an initial value.

3. The driving device of the motor according to claim 1 or 2, wherein when the control means drives the motor at a revolution speed lower than the shift revolution speed after started, the control means once accelerates the motor up to the shift revolution speed, shifts to the sensor-less vector control, and thereafter lowers the revolution speed.

4. The driving device of the motor according to claim 1 or 2, wherein the control means changes the shift revolution speed in accordance with a load situation of the motor.

* * * * *